United States Patent
Smith et al.

(10) Patent No.: US 8,862,770 B1
(45) Date of Patent: Oct. 14, 2014

(54) PROCESSOR ARCHITECTURE VERIFICATION

(75) Inventors: Zachary Steven Smith, Fort Collins, CO (US); John Warren Maly, LaPorte, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2886 days.

(21) Appl. No.: 10/704,041

(22) Filed: Nov. 6, 2003

(51) Int. Cl.
*G06F 15/173* (2006.01)
*G06F 3/00* (2006.01)

(52) U.S. Cl.
USPC ............................... 709/236; 710/15; 710/16

(58) Field of Classification Search
USPC ........... 709/223–224, 236; 710/15–19; 714/1, 714/100, 25–57
See application file for complete search history.

(56) References Cited

U.S. PATENT DOCUMENTS 6,704,794 B1 * 3/2004 Kejriwal et al. ............... 709/236
7,003,633 B2 * 2/2006 Glasco ........................... 711/146

OTHER PUBLICATIONS

Morris Mano, "Computer System Architecture", pp. 132-135, section 5-3 "Computer Instructions", 1993.*
Chandranmenon et al. "Reconsidering fragmentation and reassembly", 1996.*
IETF RFC 791, "Internet protocol", 1981.*

* cited by examiner

*Primary Examiner* — Shirley Zhang (57) ABSTRACT

A method and apparatus for tracking packets in a processor architecture verification system are disclosed herein. An embodiment of the method comprises identifying a completion event associated with the transfer of a packet across a point to point link network of a virtual bus interface; creating an identification for the packet; and storing data associated with the packet in a database, the data being indexable by way of the identification.

28 Claims, 4 Drawing Sheets

FIG. 7

PROCESSOR ARCHITECTURE VERIFICATION

BACKGROUND

Computer processor design is an extremely complex and lengthy process. The design process includes a range of tasks from high level tasks such as specifying the architecture down to low level tasks such as determining the physical placement of transistors on a silicon substrate. Each stage of the design process also involves extensive testing and verification of the design through that stage. One typical stage of processor design is to program the desired architecture for the processor using a register transfer language (RTL). The desired architecture is represented by an RTL specification that describes the behavior of the processor in terms of step-wise register contents. This simulates what the processor does without describing the physical circuit details. Thus, the architecture can be verified at a high level, independent of implementation details such as circuit design and transistor layout. The RTL specification also facilitates later hardware design of the processor.

However, manually verifying the RTL specification of the processor architecture would be prohibitively complex during the design of a modern microprocessor. Multiple test cases are typically generated to test the design. Each test case contains input instructions and may also contain the desired results or outputs. Rather than running test cases through a simulation of the RTL specification and manually verifying the results, the test cases may be executed both on a simulation of the RTL specification (often compiled to increase speed), and on a "golden simulator", with the results compared. The golden simulator is simply another simulation of the processor architecture which has a higher likelihood of accurately implementing the desired architecture than the RTL specification. The golden simulator may be implemented in any desired manner, such as a custom program written using a high-level programming language. The golden simulator is often a higher-level implementation of the processor architecture than the RTL specification, although the golden simulator typically does go into enough detail to match the major structures in the RTL specification. For example, if the RTL specification describes a translation lookaside buffer (TLB), the golden simulator should also implement a TLB to enable full testing and comparison of the RTL specification.

Test cases may thus be executed both on the RTL specification and the golden simulator, with the results compared. Any difference in the results indicates an error in the RTL simulation, the golden simulator, or both, although in theory the golden simulator is more likely to be error-free than the RTL simulation.

Custom tools such as the golden simulator are complex and expensive and may be reused for entire families of product lines all based on the same architecture. However, if the processor design is changed, it can be expensive to adapt or rewrite the tools. For example, if an updated processor design communicates through a new type of output interface, the golden simulator may be rendered useless, even if the underlying architecture matches that in the golden simulator. If the output of the RTL specification is in the new output format, the golden simulator is either modified to also produce the new output format or is replaced.

SUMMARY

A method and apparatus for tracking packets in a processor architecture verification system are disclosed herein. An embodiment of the method comprises identifying a completion event associated with the transfer of a packet across a point to point link network of a virtual bus interface; creating an identification for the packet; and storing data associated with the packet in a database, the data being indexable by way of the identification.

DESCRIPTION

The drawing and description, in general, disclose a method and apparatus for verifying a processor architecture. A more detailed description follows, which describes verifying processor architecture wherein partially transmitted packets may trigger system events, such as global visibility time for memory ordering and other system events. As described further below, a method and apparatus identifies and tracks the partially transmitted packets so that they may be processed during processor verification.

The processor architecture is verified by executing at least one test case 10 (FIG. 1) on both a register transfer language (RTL) simulator 12 and a golden simulator 14. The RTL simulator 12 and the golden simulator 14 both simulate the desired architecture 16 and 20, respectively, of the processor. However, because the output of the RTL simulator 12 and the golden simulator 14 are in different formats as will be discussed below, a translator 22 translates the output of the RTL simulator 12 to match the format of the golden simulator 14. It is noted that the output of the golden simulator 14 may alternatively be translated to match the format of the RTL simulator 12, although in the exemplary embodiments described herein, the output format of the golden simulator 14 is simpler than that of the RTL simulator 12.

Figure 1:
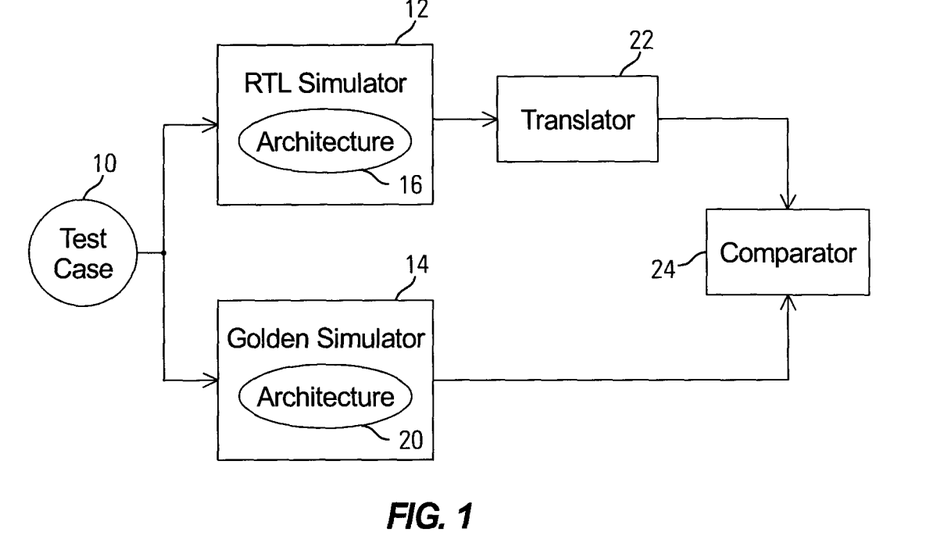
FIG. 1 is an exemplary embodiment of a block diagram of a system for verifying a processor architecture.

The translated output of the RTL simulator 12 (translated in the translator 22) is compared with the output of the golden simulator 14 in a comparator 24. If any differences in the outputs are detected by the comparator 24, the designer is alerted to the fact that an error may exist in the RTL simulator 12 or the golden simulator 14 or both. This enables a large number of test cases to be applied to the processor architecture quickly while minimizing required designer attention.

In the exemplary embodiment described herein, the golden simulator 14 is designed with a front side bus (FSB) output interface, while the RTL simulator 12 is designed with a point-to-point (P2P) link network output interface, as will be described in more detail below. The translator 22 acts as a virtual bus interface (VBI), translating transactions from the RTL simulator 12 from P2P link network format to FSB format for comparison with the FSB format output of the golden simulator 14.

The difference in output interface between the RTL simulator 12 and the golden simulator 14 may arise when the same golden simulator 14 is used in the design of more than one processor such as a family of processors, all sharing the same underlying architecture. If the golden simulator 14 is designed with a given output interface in mind, and a new processor is designed with a different output interface, the translator 22 enables the same golden simulator 14 to be used with the RTL simulator 12 for the new processor. The translator 22 therefore translates transmissions from the RTL simulator 12 from P2P link network format to FSB format, for comparison with the FSB format output of the golden simulator 14.

In another exemplary embodiment, the translator 22 also de-pipelines the output of the RTL simulator 12 for comparison with the output of the golden simulator 14. In this embodiment, the translator 22 is referred to as a depiper for de-pipelining the output of the RTL simulator 12, with the VBI in the depiper for translating transactions from P2P link network format to FSB format. The output of the RTL simulator 12 is de-pipelined in this exemplary embodiment because the golden simulator 14 is more abstract than the RTL simulator 12, that is, the golden simulator 14 does not include the same level of detail about the architecture being verified as does the RTL simulator 12. For example, the architecture as simulated by the RTL simulator 12 may be superscalar and highly pipelined, etc., while the golden simulator 14 simulates the architecture without this level of detail, as a simple machine that operates on a single instruction at a time. As a further example, 20 to 30 instructions may be acting on the RTL simulator 12 simultaneously, so the output of the RTL simulator 12 does not match the output of the golden simulator 14 directly, even though the underlying architecture is the same and the test case is identical.

The inclusion of the translator 22 in the verification system is of great benefit, allowing the same golden simulator 14 to be used regardless of the format of the output. Therefore, many processors may be designed with the aid of the golden simulator 14 without the need to redesign the golden simulator 14 for each processor. This reduces the cost of the verification, and greatly increases the confidence in the golden simulator 14.

Now that the verification system and its benefits have been briefly discussed, the elements of the system will be described in more detail. The test case 10 in one exemplary embodiment consists of a program to be executed on the processor architecture 16 and 20 in the RTL simulator 12 and golden simulator 14. The test case program is a memory image of one or more computer executable instructions, along with an indication of the starting point, and may also be accompanied by other state specifiers such as initial register contents, external interrupt state, etc. The test case 10 may be provided for execution on the RTL simulator 12 and golden simulator 14 in any suitable manner, such as an input stream or an input file specified on a command line.

The RTL specification may be implemented using any suitable tool for simulating the processor architecture 16, such as any register transfer language description of the architecture, which may be interpreted or compiled to act as a simulation of the processor. The RTL simulator 12 of an exemplary embodiment contains an Application Program Interface (API) which enables external programs, including the translator 22, access to the state of various signals in the simulated processor such as register contents, input/outputs (I/Os), etc. Thus, the output of the RTL simulator 12 may be produced in any of a number of ways, such as an output stream, an output file, or as states which are probed by an external program through the API. The RTL simulator 12 may simulate any desired level of architectural detail, such as a core, or a core with one or more output interfaces, etc.

The golden simulator 14 of the exemplary embodiment is a more abstract, higher level simulation of the processor architecture 20, and is therefore theoretically less likely to include faults or errors than the RTL simulator 12. The golden simulator 14 is written using a high level programming language such as C. Alternatively, the golden simulator 14 may be written using any other suitable programming language, whether compiled, interpreted, or otherwise executed. Whereas the RTL simulator 12 actually matches the details and reality of the processor being simulated to a great degree, the golden simulator 14 is a high level, conceptual model without concern for timing considerations arising from physical constraints.

The tasks in the architecture verification system may also be divided up as desired. For example, in an alternative embodiment illustrated in FIG. 2, the golden simulator 26 contains the comparator 30. In this embodiment, the test case 10 is executed by the RTL simulator 12 and the golden simulator 26. The results of the RTL simulator 12 are translated by the translator 22, and are fed into the golden simulator 26. The comparator 30 in the golden simulator 26 then compares the results of the golden simulation and the translated results from the RTL simulator 12, with the results 32 made available by the golden simulator 26.

Figure 2:
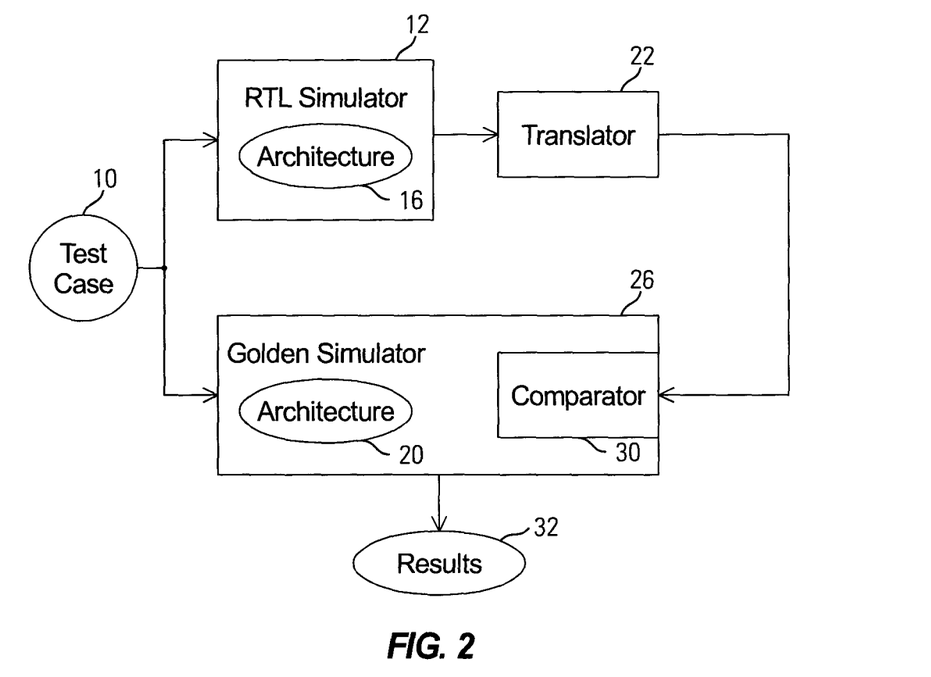
FIG. 2 is an exemplary embodiment of a block diagram of an alternative system for verifying a processor architecture.

The translator 22 design is dependent on the output formats of the RTL simulator 12 and golden simulator 14. In one exemplary embodiment, the output of the RTL simulator 12 and golden simulator 14 differ due to pipeline differences in the models as well as due to different output interfaces. The RTL simulator 12 includes architectural details such as the highly pipelined, superscalar nature of the processor. Thus, a large number of instructions may be acting on the processor at one time. In contrast, the golden simulator 14, although based on the same architecture being verified, is modeled without pipelines as a simple in-order machine that processes a single instruction at a time. In this exemplary embodiment, the translator 22 includes a depiper, and acts to de-pipeline the data and events in the RTL simulator 12. The output of the RTL simulator 12 is thus simplified to appear as if it were generated by a simple in-order machine, enabling the comparator (e.g., 24 and 30) to compare the translated results of the RTL simulator 12 with the results of the golden simulator 14. An embodiment of a depiper is described in U.S. Pat. No. 5,404,496, which is incorporated by reference herein for all that it discloses.

The depiper tracks instructions as they flow through the RTL simulator 12, noting the effects on the processor. The depiper may generate a retire record for each instruction, indicating when it started executing and when it completed or retired, along with the states that changed during execution. In some cases, if state changes cannot be tracked to a single instruction, the depiper may generate a generic report identifying an altered state and the instructions that may have caused the change. Thus, the output of the RTL simulator 12 is simplified for comparison with the golden simulator 14.

In the embodiment in which the translator 22 includes a depiper, the VBI works in parallel with the depiper in the translator 22, with the depiper producing state change records such as depiper retire records, and the VBI producing state change records in the form of synthesized FSB transactions.

Although the VBI in the exemplary embodiment reads the P2P packets directly from the P2P interface on the RTL simulator 12, and may access information about the RTL simulated processor via the API, the VBI may also access information about the RTL simulated processor that is stored in the depiper. The exemplary depiper contains structures that monitor the simulated core's states, so it may be convenient for the VBI to access some information from the depiper for use in reporting or synthesizing fields used in the FSB phases.

In another exemplary embodiment in which the translator 22 includes a depiper, the depiper first reads the P2P output of the RTL simulator 12 and de-pipelines the P2P transactions, generating a de-pipelined version of the P2P transactions. The VBI then reads the de-pipelined version of the P2P transactions from the depiper and generates corresponding FSB transactions for the comparator. The de-pipelined P2P transactions may be transferred from the depiper to the VBI in any suitable manner, such as across a virtual P2P link, or in a file containing depiper retire records.

It is noted that the VBI is not limited to use with a verification system requiring a depiper. Verification systems having the same level of pipelining detail in both processor simulators may not need a depiper, but a VBI still enables processor simulators with different output interfaces to be used together. If the translator 22 includes a depiper, the VBI may access information stored in the depiper as described above, or may be implemented as a module in the depiper for convenience.

In the embodiment in which the translator 22 does not include a depiper, the VBI in the translator 22 still connects directly to the P2P output of the RTL simulator 12, but obtains other information about the state of the simulated processor from the RTL simulator 12 via the API. The VBI uses the resulting P2P packets and other information to produce translated FSB transactions in whatever manner required by the comparator 24, such as generating a virtual FSB connection to the comparator 24, or generating output reports containing records of FSB format transactions that may be read by the comparator 24.

Figure 3:
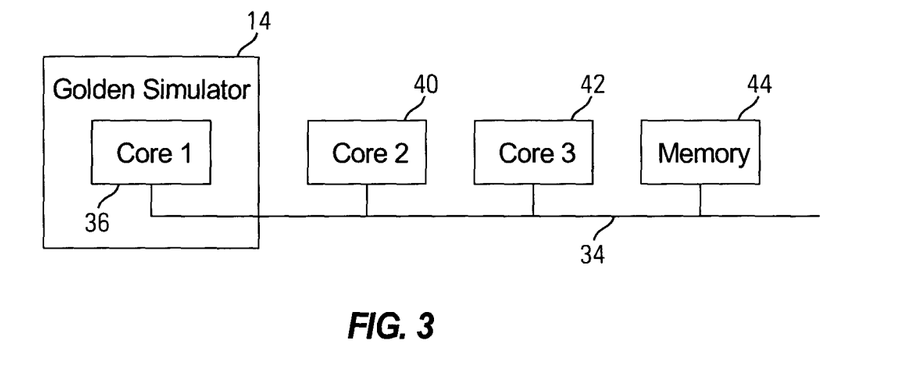
FIG. 3 is an exemplary embodiment of a block diagram of a system of computer components connected by a front side bus.

The different output interfaces of the RTL simulator 12 and the golden simulator 14 will now be described in more detail, along with the VBI in the translator 22 for generating transactions in a common output format for comparison. The golden simulator 14 uses a front side bus 34 (FSB) as illustrated in FIG. 3. A processor core 36, core 1, is based on the desired architecture 20 and is simulated in the golden simulator 14, including the FSB 34 interface to external components such as other processor cores 40 and 42 or a memory 44, etc. These external components 40, 42, and 44 may comprise actual physical devices. For example, the memory 44 may be a portion of the memory of the computer executing the golden simulator 14. Alternatively, the external components 40, 42, and 44 may be simulated components, either simulated by the golden simulator 14 or an external simulator, or they may simply be virtual components represented by pre-programmed responses in the test case 10 that are issued by the golden simulator 14 in response to transactions from simulated core 1 36.

The FSB 34 is a bus to which many components 36, 40, 42 and 44 may be connected. The FSB 34 is a broadcast bus in which bus traffic is visible to all components connected to the FSB 34, and components monitor the traffic to determine whether the traffic is addressed to them. An exemplary operation or transaction performed by the core 1 36, such as a memory read operation, may comprise multiple phases. For example, consider an exemplary read operation performed by the core 1 36 using the FSB 34 to read data from the memory 44. The exemplary transaction consists of an arbitration phase, request A, request B, snoop phase, and data phase. Each of these five phases is performed by transmitting or receiving a block of information over the FSB 34. The comparator 24 expects to see a report for each of the five phases that act as state inputs to compare against those generated by the golden simulator 26. The different phases are defined in the FSB output format and place the system into various states. For example, during the snoop phase, the transaction becomes globally visible so that the transaction is visible to each core 36, 40 and 42, facilitating a shared memory architecture (SMA).

In contrast, the RTL simulator 12 of this exemplary embodiment uses one or more ports into a point-to-point (P2P) link network 46 (FIG. 4) instead of an FSB (e.g., 34). The P2P link network 46 is a switch-based network with one or more crossbars 48 acting as switches between components such as processor cores 36, 40 and 42, memory 44, or other devices. Transactions are directed to specific components and are routed appropriately in the P2P link network 46 by the crossbar 48. This reduces the load on components because they are not required to examine each broadcast block of information as in the FSB 34. Rather, they ideally receive only data meant for them.

Figure 4:
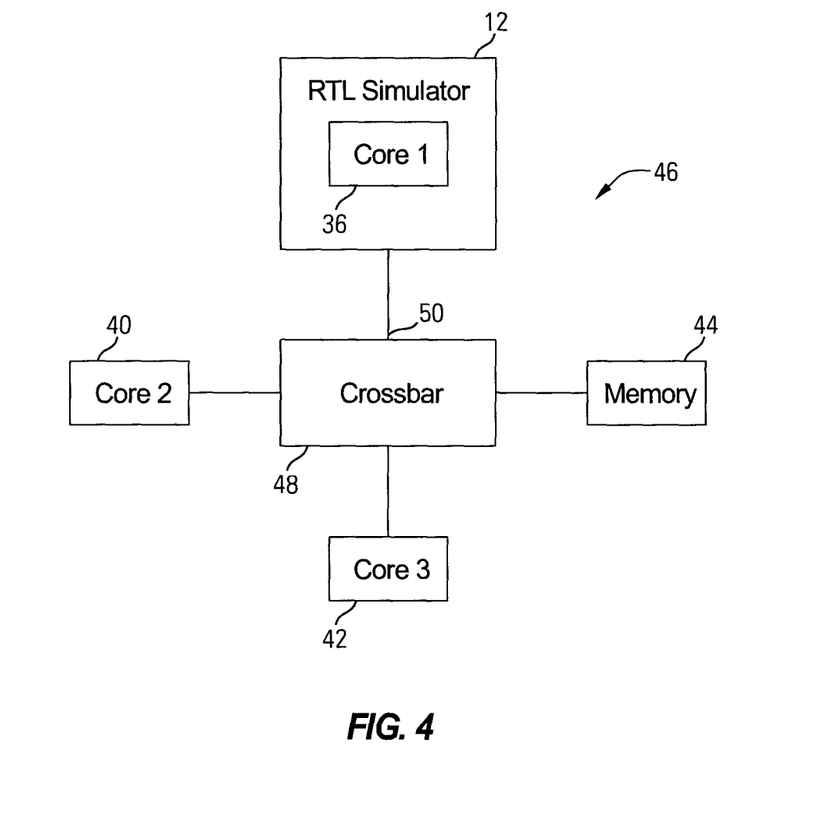
FIG. 4 is an exemplary embodiment of a block diagram of a system of computer components connected by a point-to-point link network.

The P2P link network 46 also avoids bus loading issues that plague FSB systems, which facilitates better scalability. Unlike the FSB 34 system, events in the P2P link network 46 need not occur in any specific order. Transactions on the P2P link network 46 are packet-based, with each packet containing a header with routing and other information. Packets containing requests, responses, and data are multiplexed, so portions of various transactions may be interspersed with many others in time. Transmissions are length-limited, with each length-limited block of data called a flit. Thus, a long packet will be broken into several flits, and transactions typically require multiple packets. Therefore, the P2P link network 46 is monitored over time to collect the appropriate P2P packets until enough information exists for a corresponding FSB phase to be generated by the translator 22. The above-described system events may occur on intra-packet flit boundaries, which are sometimes referred to as completion events. As described below, packets may be tracked before they complete transmission over the P2P link network 46. Accordingly, partially transmitted packets may be tracked.

In this exemplary embodiment, the translator 22 comprises a VBI to translate entire transactions, reading the P2P packets and generating corresponding FSB phases for the transaction so that the transactions can be compared by the comparator 24 with transaction from the golden simulator 14. The translator 22 may be designed to monitor only packets in and out of the simulated core 1 36, or may monitor other packets in the P2P link network 46 if desired. In the exemplary embodiment, the translator 22 monitors the port 50 on the crossbar 48 that is connected to the simulated core 1 36 in the RTL simulator 12.

Figure 5:
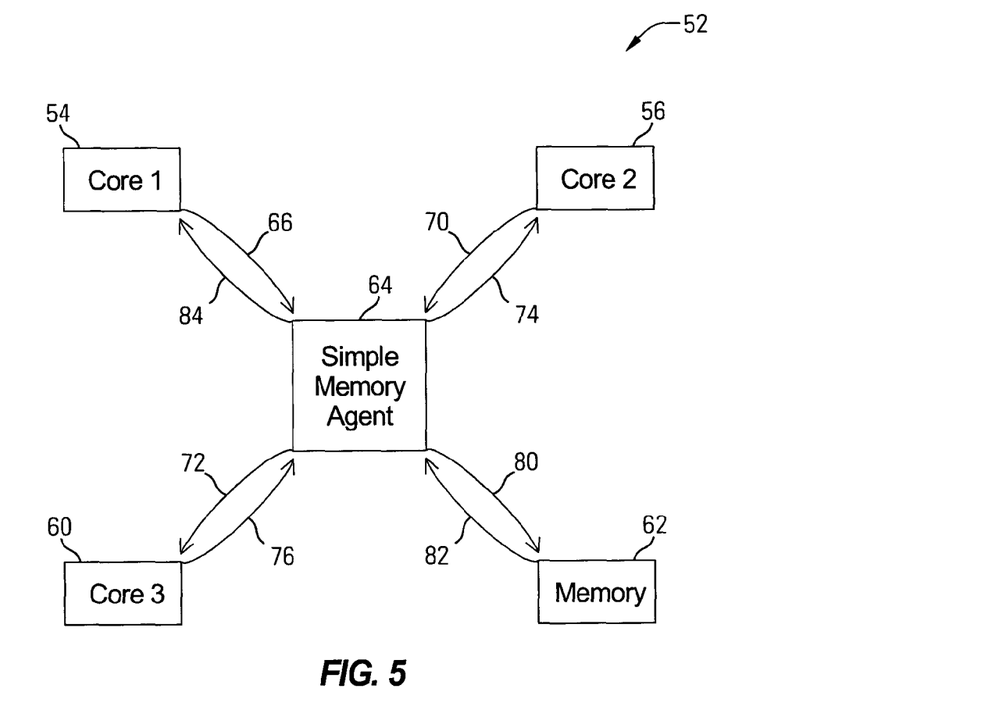
FIG. 5 is an exemplary embodiment of a block diagram illustrating logical data flow in a point-to-point link network between a group of processor cores and a memory, illustrating a read operation coordinated by a simple memory agent.

An exemplary read operation in a P2P link network is illustrated in FIG. 5. The P2P link network 52 in this example consists of three processor cores 54, 56 and 60, a memory 62 and a simple memory agent 64. (Note that the diagram of FIG. 5 illustrates logical data flow, not physical connections, and that a crossbar through which all packets flow is not shown.) The first core 54 (core 1) is simulated in an RTL simulator, although the other components 56, 60, 62 and 64 may also be simulated as discussed above. The term "data line" refers to a line of data, such as a computer executable instruction line a line of pure data, which is stored in the memory 62 and copies of which may also be temporarily stored in caches in one or more of the cores 54, 56 and 60. The term "simple" with respect to the simple memory agent 56 indicates that no directory of data line locations exists, so the simple memory agent 56 is unaware of which component in the system is holding the controlling version of any given data line.

During the read operation, core 1 54 sends a packet 66 to the simple memory agent 64 requesting a line of data. Because the system does not include a directory, the simple memory agent 64 does not know where the controlling version of the line being read is located. Therefore, the simple memory agent 64 sends a packet 70 and 72 to each of the other cores 56 and 60, respectively, inquiring whether those cores 56 and 60 contain a controlling copy of the line. Assuming in this example that they do not, both cores 56 and 60 respond with a packet 74 and 76 indicating that they do not have a copy of the line. The simple memory agent 64 then sends a packet 80 to the memory 62, which responds with a packet 82 containing the line to the simple memory agent 64. The simple memory agent 64 then sends a packet 84 containing the line to the requesting core 54.

Each of the packets in the above-described example may be divided into multiple flits. Furthermore, depending on the particular protocol of the P2P link network, additional packets may be transmitted about in the P2P link network 52 during the transaction. For example, packets may be transmitted that indicate the transaction is complete. Thus, packets in the P2P link network format are formatted and divided much differently than corresponding FSB phases of a transaction, and each may include information not provided in the other format.

Although the details of how the translator 22 translates transaction from P2P format to FSB format are dependent on the actual output interfaces and protocols, the operation of the translator 22 in one exemplary embodiment will now be described. During this description, please note that multiple P2P packets and FSB phases may be involved in a single transaction such as a read or write operation. Furthermore, a transaction may be divided differently in the P2P and FSB formats. Therefore, the translator translates by transaction rather than by P2P packet in the exemplary embodiment. However, not all P2P packets for a transaction need be received before beginning to generate corresponding FSB phases for the transaction. For example, after receiving the second P2P packet in a five-packet transaction, it may be possible to generate the second corresponding FSB phase if sufficient information has been received.

The translator 22 monitors each virtual channel, both incoming and outgoing, on each selected P2P port. For example, the translator 22 may be configured to monitor all input and output ports on the simulated core. The translator 22 tracks the ports clock tick by clock tick. (The clock may be a source clock in the P2P output interface of the simulated core, or a clock signal in the virtual P2P link network wires, etc.) The translator 22 first assembles transmissions into packets, which may comprise receiving multiple flits to form a packet, as described above.

When a packet has been received, its header is examined to see if the packet type is one that should be translated or discarded. Only P2P packets corresponding to an FSB phase in a transaction are translated. For example, flow control packets or bus status packets relating to the P2P link network 46 which have no analogue in the FSB protocol are not translated.

When the first packet of a transaction has been received, a packet list is created for that transaction to contain or identify all received packets for that transaction. When additional packets for that transaction are received, they are added to the appropriate packet list. The transactions being translated are managed and accessed by an associative array containing pointers to the packet lists for each transaction. Each transaction is assigned an identifier "txnid" which is used as an index into the associative array, as follows: transaction{txnid}. The first entry in the packet list for each transaction contains information about the transaction, such as the transaction type and location, whether the packet is incoming or outgoing, timing information, and the port and channel. Each transaction that has had some activity during the current clock tick is marked as active using another associative array as follows: active{txnid}=1.

Once all monitored channels have been processed as described above for the current clock tick, the list of active transactions for this clock tick is processed to determine if an FSB phase may be generated based on the information received to this point. The type of each active packet list is noted, and each active packet list is scanned to determine whether, based on the type, an FSB phase for the transaction can be generated. Each transaction may include multiple P2P packets and may initiate the generation of multiple FSB phases by the translator. If an FSB phase is generated based on packets in the P2P packet list, the packet list is annotated to indicate that the FSB phase has been generated, preventing later generation of a duplicate FSB phases.

Lookup tables are used in the exemplary translator 22 to generate FSB phases corresponding to one or more P2P packets. Meta-informational values in the FSB phases are translated from the packet list as well, such as request step time, a unique FSB transaction number, etc. FSB fields such as transaction type, address, code, write-snoop, lock, dry ads, length, attribute, hit, hitm, etc., may be filled in with default values, or using a lookup table to translate from values in the P2P packet list, or synthesizing new information. This synthesizing may be performed by using the transaction/packet type in the translation function, reading signals from other parts of the simulation, or from other information. For example, the signal delay from a data-bus to a control path may be added to an observability time. Other packets other than that triggering the reporting event may also be examined to determine proper field contents. It is also noted that some information may not need to be included in FSB phases if the information is not needed by the comparator 24 for verifying the simulated core. In such a case, dummy values may be inserted.

The translator 22 may also perform any other appropriate functions. These functions include rearranging the byte/word order in a line of data because of critical-chunk differences in the output interfaces, or changing the reported "completion time" based on the type of transaction.

Once a transaction has been completely translated, it is removed from the list of transactions being processed. The list of active transactions is also cleared at the end of translation processing for a clock tick to prepare for the next clock tick.

As discussed above, translation details are dependent upon the differences between the golden simulator 14 and the RTL simulator 12, such as the output interfaces and the level of architectural detail included in each. It is therefore be understood that the translator 22 may be adapted by one skilled in the art based upon the differences between the golden simulator 14 and the RTL simulator 12.

Figure 6:
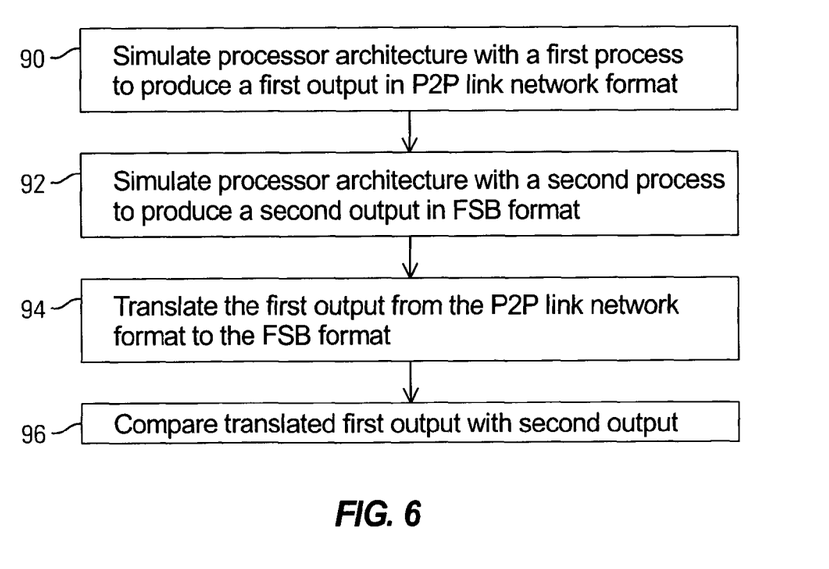
FIG. 6 is an exemplary embodiment of a flow chart of an operation for verifying a processor architecture.

In summary, the architecture of a processor design may be verified by simulating the processor architecture with a first process 90 (FIG. 6) to produce a first output in a P2P link network format and with a second process 92 to produce a second output in a FSB format. For example, as described above with respect to one exemplary embodiment, the first process may comprise an RTL simulation of a highly pipelined processor with a P2P link network output, the second process may comprise a golden simulation of a simple in-order machine that processes a single instruction at a time, with an FSB output, both based on the same architecture. The first output is translated 94 from the P2P link network format to the FSB format, and the translated first output is compared 96 with the second output.

Having described the verification apparatus and method, embodiments will be described wherein packets may be tracked before they complete transmission over the P2P link network 46. A packet may contain a header followed by data. In some embodiments, the packet may contain only header information. Transmission over the P2P link network 46 may include a first packet that may contain header information and a second packet or plurality of packets that may contain data.

Referring to FIGS. 1 and 4, in this embodiment, the VBI in the translator 22 examines the packets in at least two instances. These two instances are sometimes referred to as completion events. The first completion event occurs when the header of the packet has transmitted over the crossbar 48. In some embodiments, the first completion event may occur when the last flit of the header passes into or out of a port (not shown) in the crossbar 48. In other embodiments, the completion event may occur when the last flit of the header passes other portions of the P2P link. The second completion event occurs when a packet has completely transferred into or out of the above-described port in the crossbar 48. Some packets only contain header information. Therefore, these packets are only examined once. These packets may also be considered to have both completion events occur simultaneously.

The header and, thus, the first completion event, may occur in one or two flits. The data portion of the packet may not complete for several flits. For example, the data portion may not complete for 1-16 flits. As described below, a data structure is created which stores packet data. The data structure is sometimes referred to as a database. The data in the data structure is indexed by way of the packet identification.

Figure 7:
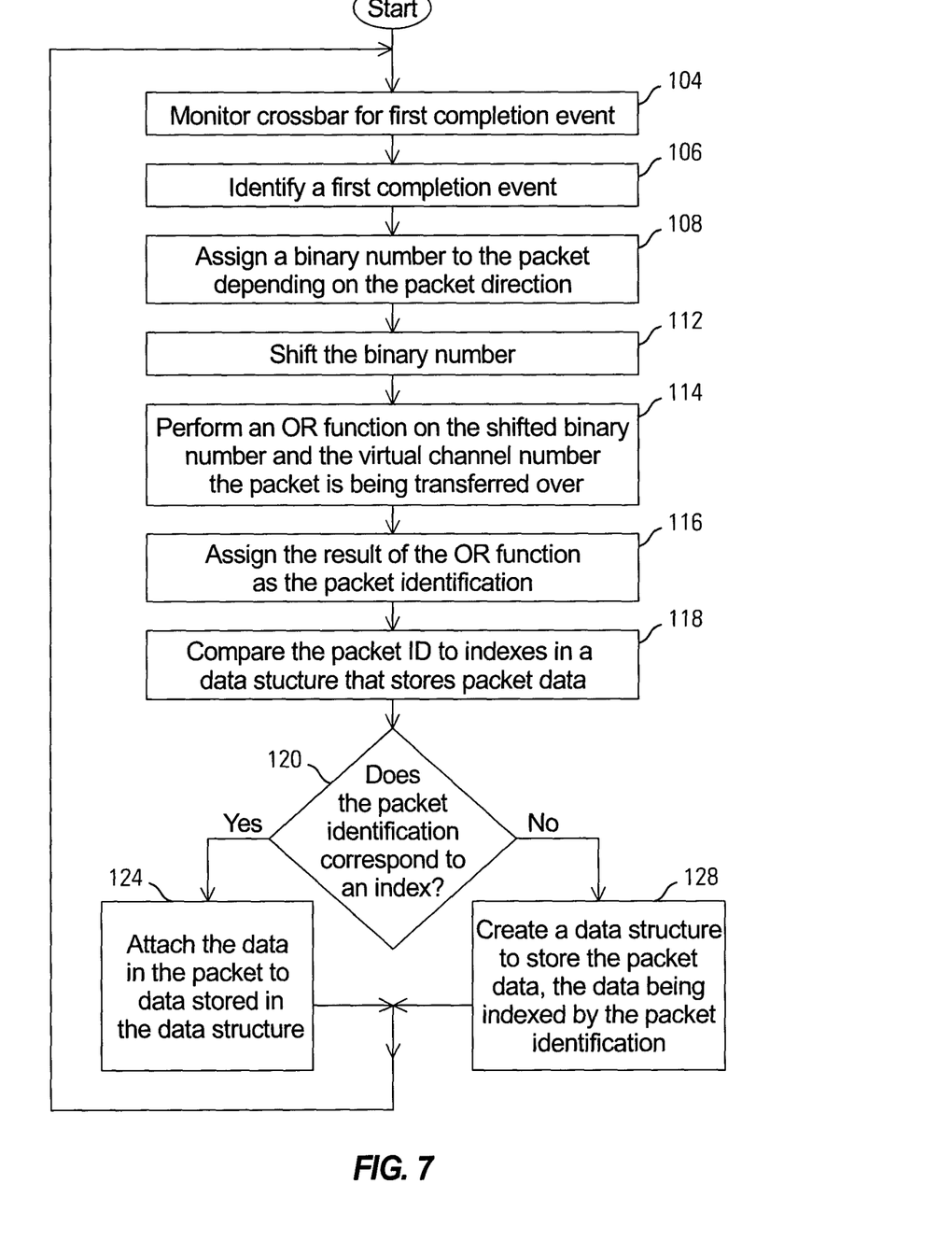
FIG. 7 is an exemplary embodiment of a flow chart of an operation for tracking packets in the system for verifying system architecture.

In order to enhance the processor verification process, partially transmitted packets, rather than fully transmitted packets, may be processed. In doing so, the partially transmitted packets must be identified and tracked. The process of identifying and tracking partially transmitted packets is illustrated in the flow chart of FIG. 7. A packet identification is generated, which is unique to each packet during their lifetimes. With reference to FIGS. 1, 4 and 7, at step 104 of FIG. 7, the crossbar 46 is monitored for a first completion event. At step 106, a first completion event is identified.

When a completion event has been identified, a packet identification is assigned to the packet as described below. At step 108 a binary number is assigned to the packet depending on the direction of the packet. The binary number my as an example, be a one for an incoming packet and a zero for an outgoing packet. At step 112, the binary number is shifted. In one embodiment, the binary number is shifted sixteen bits to the left. At step 114, an OR function is performed between the shifted binary number and the virtual channel in which the packet is being transferred over. Other embodiments may use different information to identify the port designation used in the OR function. At step 116, the result of the OR function is assigned to the packet as the packet identification.

Now that the packet identification has been established, the identification is checked against packet identifications in the data structure as set forth in step 118. More specifically, the packet identification is used as an index within the data structure. If the data structure contains this index, then a partially transmitted packet has previously been transmitted as shown in step 120. The data in the packet is then attached to the packet data in the data structure as shown in step 124. If no packet identification or index is available in the data structure, the data structure is either created or amended to store the data as shown in step 128.

When the transmission of a packet is complete, the associated transaction may be further processed in the virtual bus interface. In some embodiments, the transaction maybe processed prior to completion of the packet. It should be noted that in some embodiments, the packet only contains header information without data. Accordingly, the packet is complete after the first completion event and the above-described tracking and identification need not occur.

Various computer readable or executable code or electronically executable instructions have been referred to herein. These may be implemented in any suitable manner, such as software, firmware, hard-wired electronic circuits, or as the programming in a gate array, etc. Software may be programmed in any programming language, such as machine language, assembly language, or high-level languages such as C or C++. The computer programs may be interpreted or compiled.

Computer readable or executable code or electronically executable instructions may be tangibly embodied on any computer-readable storage medium or in any electronic circuitry for use by or in connection with any instruction-executing device, such as a general purpose processor, software emulator, application-specific circuit, a circuit made of logic gates, etc. that can access or embody, and execute, the code or instructions.

Methods described and claimed herein may be performed by the execution of computer readable or executable code or electronically executable instructions, tangibly embodied on any computer-readable storage medium or in any electronic circuitry as described above.

A storage medium for tangibly embodying computer readable or executable code or electronically executable instructions includes any means that can store, transmit, communicate, or in any way propagate the code or instructions for use by or in connection with the instruction-executing device. For example, the storage medium may include (but is not limited to) any electronic, magnetic, optical, or other storage device, or any transmission medium such as an electrical conductor, an electromagnetic, optical, infrared transmission, etc. The storage medium may even comprise an electronic circuit, with the code or instructions represented by the design of the electronic circuit. Specific examples include magnetic or optical disks, both fixed and removable, semiconductor memory devices such as memory cards and read-only memories (ROMs), including programmable and erasable ROMs, non-volatile memories (NVMs), optical fibers, etc. Storage media for tangibly embodying code or instructions also include printed media such as computer printouts on paper which may be optically scanned to retrieve the code or instructions, which may in turn be parsed, compiled, assembled, stored and executed by an instruction-executing device. The code or instructions may also be tangibly embodied as an electrical signal in a transmission medium such as the Internet or other types of networks, both wired and wireless.

While illustrative embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for tracking packets in a processor architecture verification system, said method comprising:

identifying a completion event corresponding to a partial transmission of a packet across a point to point link network of a virtual bus interface;

upon identification of the completion event, determining whether said partially transmitted packet contains data in addition to information contained in a header; if so, then creating an identification for said partially transmitted packet; and storing said data contained in said partially transmitted packet in a database, said data being indexable by way of said identification; and initiating processing of said partially transmitted packet prior to completion of transmission of the packet across the point to point link network, wherein said processing comprises translating the partially transmitted packet from a first format suitable for communication on the point to point link network to a second format suitable for communication on a different type of network.

2. The method of claim 1, wherein said identifying a completion event comprises identifying the completion of transmission of a header of said partially transmitted packet.

3. The method of claim 2, further comprising identifying a second completion event corresponding to completion of transmission of data associated with said partially transmitted packet.

4. The method of claim 1, wherein said creating an identification comprises:

selecting a binary number representative of the direction of said packet; and performing an OR function with said binary number and a channel within said virtual bus interface that said packet is being transferred, the result of said OR function being said identification.

5. The method of claim 4, and further comprising shifting said binary number.

6. The method of claim 4, and further comprising shifting said binary number sixteen bits to the left.

7. The method of claim 1, and further comprising attaching said data contained in said packet to data in a data structure that is indexable by said identification.

8. The method of claim 1, wherein said completion event corresponds to the partial transmission of said packet across a crossbar of the point to point link network.

9. The method of claim 8, further comprising identifying a second completion event corresponding to a complete transmission of the packet across the crossbar.

10. The method of claim 1, wherein the second format is a non-packet based format.

11. An apparatus for tracking packets in a processor architecture verification system, said apparatus comprising:

means including a processor to determine when a completion event corresponding to a partial transmission of a packet across a point to point link network of a virtual bus interface occurs;

means including a processor to determine, upon occurrence of the completion event, whether said partially transmitted packet contains data in addition to information contained in a header;

means including a processor to create an identification for said partially transmitted packet if said partially transmitted packet contains said data in addition to information contained in a header;

means for storing said data contained in said partially transmitted packet in a database, said data being indexable by way of said identification; and means including a processor for initiating processing of said partially transmitted packet prior to completion of transmission of said packet across the point to point link network, wherein said processing comprises translating the partially transmitted packet from a first format suitable for communication on the point to point link network to a second format suitable for communication on a different type of network.

12. The apparatus of claim 11, wherein said means including a processor to determine comprises means for identifying the completion of transmission of a header of said partially transmitted packet.

13. The apparatus of claim 12, wherein said means including a processor to determine comprises means for identifying a second completion event corresponding to completion of transmission of data associated with said partially transmitted packet.

14. The apparatus of claim 11, wherein said means including a processor to associate comprises:

means for selecting a binary number representative of the direction of said packet; and means for performing an OR function with said binary number and a channel within said virtual bus interface that said packet is being transferred, the result of said OR function being said identification.

15. The apparatus of claim 11, and further comprising means for attaching said data contained in said partially transmitted packet to data in a data structure that is indexable by said identification.

16. The apparatus of claim 11, wherein said completion event occurs when the packet is partially transferred across a crossbar of a virtual bus interface.

17. The apparatus of claim 16, further comprising means to determine when a second completion event corresponding to a complete transmission of the packet across the crossbar occurs.

18. The apparatus of claim 11, wherein the second format is a non-packet based format.

19. A computer-readable non-transitory storage medium having stored thereon on instructions, which, when executed by a processor, cause the processor to:

identify a completion event corresponding to a partial transmission of a packet across a point to point link network of a virtual bus interface;

upon identification of said completion event, determine whether said partially transmitted packet contains data in addition to information contained in a header, and, if so, then create an identification for said partially transmitted packet;

store said data contained in said partially transmitted packet in a database, said data being indexable by way of said identification; and initiate processing of said partially transmitted packet prior to completion of transmission of said packet across the point to point link network, wherein said processing comprises translating said partially transmitted packet from a first format suitable for communication on said point to point link network to a second format suitable for communication on a different type of network.

20. The computer-readable non-transitory storage medium of claim 19, wherein said completion event is the completion of transmission of a header of said partially transmitted packet.

21. The computer-readable non-transitory storage medium of claim 20, further comprising instructions which, when executed, cause the processor to identify a second completion event corresponding to complete transmission of data associated with said partially transmitted packet.

22. The computer-readable non-transitory storage medium of claim 19, further comprising instructions which, when executed by a processor, cause the processor to:
- select a binary number representative of the direction of said packet; and
- perform an OR function with said binary number and a channel within said virtual bus interface that said packet is being transferred, the result of said OR function being said identification.

23. The computer-readable non-transitory storage medium of claim 22, further comprising instructions which, when executed by a processor, cause the processor to shift said binary number.

24. The computer-readable non-transitory storage medium of claim 19, further comprising instructions which, when executed by a processor, cause the processor to shift said binary number sixteen bits to the left.

25. The computer-readable non-transitory storage medium of claim 19, further comprising instructions which, when executed by a processor, cause the processor to attach said data contained in said partially transmitted packet to data in a data structure that is indexable by said identification.

26. The computer-readable non-transitory storage medium of claim 19, further comprising instructions which, when executed by a processor, cause the processor to identify a completion event corresponding to a partial transmission of a packet across a crossbar of a virtual bus interface.

27. The computer-readable non-transitory storage medium of claim 26, further comprising instructions which, when executed by a processor, cause the processor to identify a second completion event corresponding to a complete transmission of the packet across the crossbar.

28. The computer-readable non-transitory medium of claim 19, wherein the second format is a non-packet based format.

* * * * *

UNITED STATES PATENT AND TRADEMARK OFFICE
CERTIFICATE OF CORRECTION

PATENT NO.        : 8,862,770 B1                           Page 1 of 1
APPLICATION NO.   : 10/704041
DATED             : October 14, 2014
INVENTOR(S)       : Zachary Steven Smith et al.

It is certified that error appears in the above-identified patent and that said Letters Patent is hereby corrected as shown below:

In the Claims

In column 14, line 17, in Claim 28, before "medium" insert -- storage --.

Signed and Sealed this
Fourteenth Day of April, 2015

Michelle K. Lee
*Director of the United States Patent and Trademark Office*